Patented Jan. 14, 1936

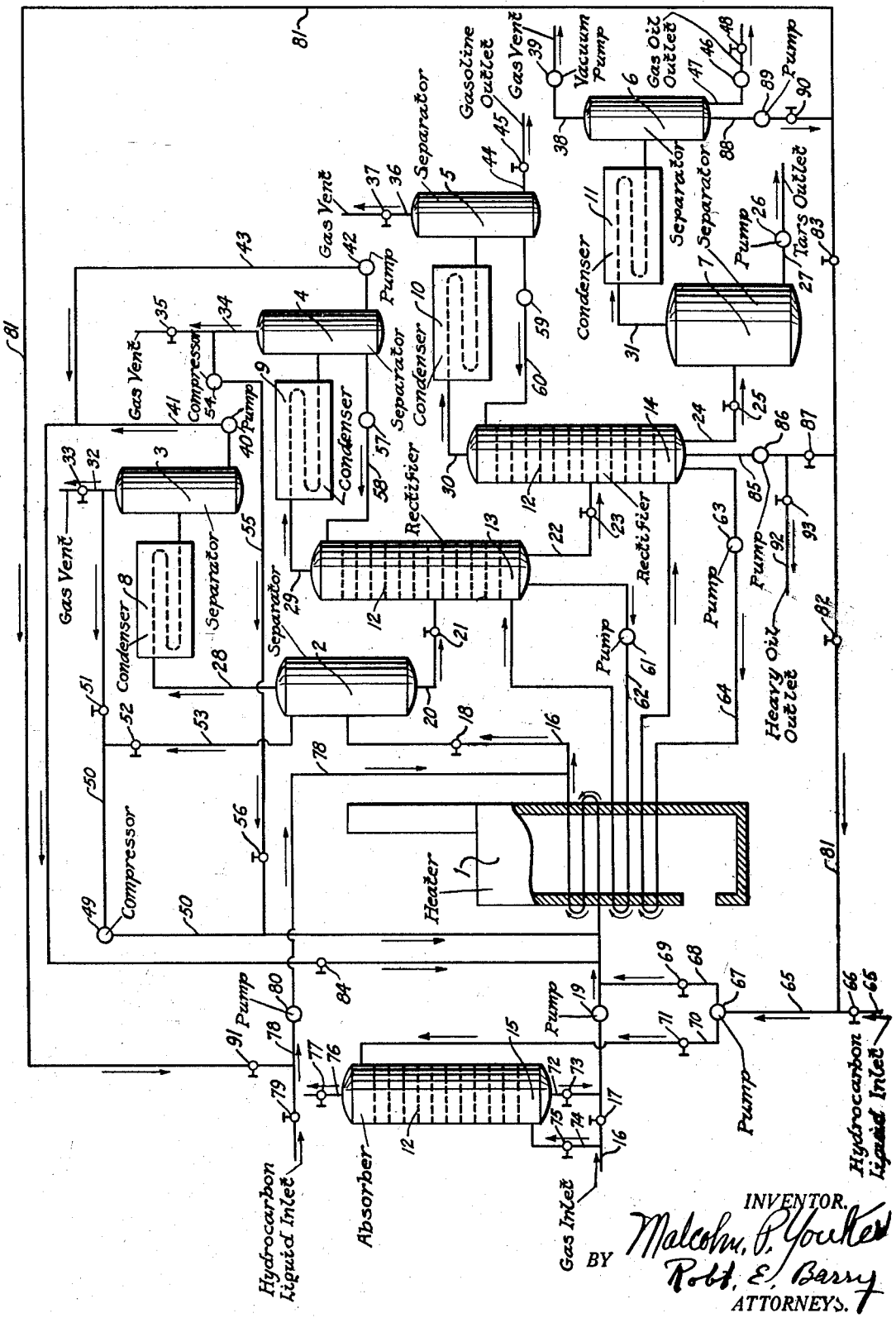

2,027,460

UNITED STATES PATENT OFFICE 2,027,460

NATURAL GAS CONVERSION PROCESS

Malcolm P. Youker, Bartlesville, Okla., assignor to Phillips Petroleum Company, Bartlesville, Okla., a corporation of Delaware Application September 11, 1930, Serial No. 481,318

22 Claims. (Cl. 196—9)

My invention relates to improvements in a natural gas conversion process, and has particular reference to improvements in the natural gas conversion process which was disclosed in my Letters Patent No. 1,800,586, dated April 14, 1931. The disclosure contained herein should be taken in conjunction with the application for said Letters Patent and considered as a continuation in part of the same.

In general, the object of this natural gas conversion process is to manufacture hydrocarbon liquids from hydrocarbon gases, either by adding carbon to said gases or removing hydrogen from said gases.

After having carried out certain studies and designed a commercial plant with which to carry out said natural gas conversion process, I have decided to alter the detail of that part of the appparatus used to vent permanent gases from the process system, and also the detail of that part of the apparatus used to retain under pressure and recirculate through the process under pressure, part of the hydrocarbon gases which are produced by the process, and which are more volatile than gasoline. I have also added to the appparatus used to carry out this process, additional fractionating equipment with which to separate the products of the process into finished distillates and an absorber by means of which fuel oil or gas oil used in the process may be initially used to liquefy gas to be processed. Several other minor alterations in the appparatus originally disclosed have been made and are disclosed herein.

An object of my new improvements is to obtain desirable savings in the cost of the operation of the apparatus with which to carry out the conversion of hydrocarbon gases to hydrocarbon liquids in the commercial application of this process. This advantage and, likewise, other advantages, which will be apparent, are accomplished by my new improvements.

My new improvements will be more fully understood from the following description, taken in conjunction with the accompanying drawing, in which:

The figure illustrates diagrammatically in side elevation, one form of apparatus by which my new improvements may be carried out.

Referring to the drawing, the numeral 1 designates a furnace through which certain pipe lines are passed. The numerals 2, 3, 4, 5, 6 and 7 designate cylindrical closed vessels which are used for separating vapors and gases from liquids. Pipe lines in which condensation takes place are passed through condensers 8, 9, 10 and 11. Bubble trays 12 are disposed in fractionating columns 13 and 14 and an absorbing tower 15.

Hydrocarbon gases in either liquid or vapor phase will be delivered through a pipe line 16 in which is mounted a valve 17, a pump 19 and a valve 18 and through furnace 1 into separator 2. Liquid which will collect in separator 2 will flow thence through a pipe 20 in which is mounted a valve 21 into the fractionating column 13. Liquid which will collect at the bottom of fractionating column 13 will flow thence through a pipe 22 in which is mounted a valve 23 into the fractionating column 14. Liquid which will collect at the bottom of fractionating column 14 may flow thence through a pipe line 24 in which is mounted a valve 25 into separator 7. Liquid or tar which may accumulate in separator 7, will be discharged therefrom by a pump 26 through a pipe line 27 and a cooler which is not shown. Vapors and permanent gases will pass from the top of separator 2 by way of a pipe line 28 through condenser 8 into separator 3. Vapors and gases will pass from the top of fractionating column 13 by way of a pipe 29 through condenser 9 into separator 4. Vapor and gases will pass from the top of fractionating column 14 by way of a pipe 30 through condenser 10 into separator 5. Vapors will pass from the top of separator 7 by way of pipe line 31 through condenser 11 into separator 6. Gases such as excess hydrogen, hydrogen sulphide, nitrogen, and helium will be vented from the system through a pipe line 32 in which is mounted a back pressure valve 33 and which leads from the top of separator 3. Gases may be vented from the top of separator 4 through a pipe 34 in which is mounted a back pressure valve 35. Gases may be vented from the top of separator 5 through a pipe 36 in which is mounted a back pressure valve 37. A pipe 38 in which is mounted a vacuum pump 39 leads from the top of separator 6. The vacuum pump 39 may be operated to maintain a vacuum in separators 6 and 7 and their inter-connecting pipe line 31. Liquid which will accumulate in the bottom of separator 3 will be pumped by a pump 40 through a pipe line 41 and valve 84 into pipe 16 at a point between the pump 19 and the furnace 1. Liquid which will accumulate in the separator 4 will be delivered by a pump 42 through a pipe 43 and through pipe 41 into the pipe 16 at a point between pump 19 and the furnace 1. Liquid which will collect in the bottom of separator 5 will be delivered thence through a pipe 44 in which is mounted a valve 45. Liquid which will accumulate in the bottom of separator 6 may be delivered thence by a pump 46 through pipe 47 and valve 48. A compressor 49 may be operated to deliver gas from the top of separator 3 through pipe 32 and a pipe 50 and a valve 51 into pipe 16 at a point between pump 19 and furnace 1. By means of manipulating a valve 52 which is mounted in a pipe 53, gas and vapor may be delivered from separator 2 by a compressor 49 into pipe 16 at a point between pump 19 and furnace 1. A compressor 54 may be operated to deliver gas through pipe 34 and pipe 55 and a valve 56 and pipe 50 from the separator 4 into the pipe 16 at a point between pump 19 and furnace 1. A reflux liquid will be delivered from the bottom of separator 4 by means of a pump 57 through a pipe 58 into the top of fractionating column 13. Liquid will be delivered from the bottom of separator 5 by means of a pump 59 through a pipe 60 into the top of fractionating column 14. Liquid will be forced by a pump 61 through a pipe 62 which leads from the bottom of fractionating column 13 through the furnace 1 and back into the bottom of the fractionating column 13. Liquid will be forced from the bottom of fractionating column 14 by a pump 63 through a pipe 64 which leads through the furnace 1 and back into the bottom of fractionating column 14. A pipe 65 in which is mounted a valve 66 and which is in communication with an extraneous supply of hydrocarbon liquid such as fuel oil or gas oil, leads to a pump 67. A pipe 68 in which is mounted a valve 69, leads from the discharge of pump 67 into the pipe 16 at a point between pump 19 and furnace 1. A pipe 70 in which is mounted a valve 71 leads from the discharge of pump 67 into the top of an absorber 15. A pipe 72 in which is mounted a valve 73 leads from the bottom of absorber 15 into pipe line 16 at a point on the suction side of pump 19. Heavy oil such as fuel oil or gas oil may be delivered by the pump 67 through the pipes 65 and 68 into the pipe line 16 at a point between the pump 19 and furnace 1, or such heavy oil may be delivered by the pump 67 through the pipes 65 and 70 into the absorber 15 and thence through pipe 72 into the pipe 16 and thence to pump 19. Gas may be delivered through pipe 16, a pipe 74, and a valve 75 into the bottom of absorber 15 and thence through absorber 15 and a pipe 76 in which is mounted a back pressure valve 77. Heavy oil such as fuel oil or gas oil or crude oil may be delivered through a pipe 78 in which is mounted a valve 79 by a pump 80 into the pipe 16 at a point between furnace 1 and separator 2. A pipe 81 in which are mounted valves 82, 83, and 91, connects into pipe 78 on the suction side of pump 80 and connects into the pipe 65 on the suction side of pump 67. A pipe 85 in which is mounted a pump 86 and a valve 87 leads from the bottom of fractionating column 14 into pipe 81. A pipe 88 in which is mounted a pump 89 and a valve 90 leads from the bottom of separator 6, into pipe 81. By means of the pump 89 and the valves and pipes shown, liquid may be delivered from the bottom of separator 6 to the suction side of either of the pumps 67 or 80. By means of the pump 86 and the valves and the pipes described, liquid may be delivered from the bottom of fractionating column 14 to the suction side of either pump 67 or pump 80. A pipe 92 in which is mounted a valve 93 connects into pipe 85 at a point between pump 86 and valve 87 and liquid may be withdrawn from the bottom of fractionating column 14 through this pipe 92 and delivered to storage through a cooler which is not shown.

Hydrocarbon liquids may be made from hydrocarbon gases by two methods which are closely related. These methods of gas conversion may be used separately or may be combined in the same process. The apparatus shown may be used to carry out either one of these methods or the combination of the two methods. For purposes of clarity, I will describe these methods separately. Some of the hydrogen may be removed from hydrocarbon gases and the remaining hydrogen content of such gases be simultaneously recombined with the carbon content of such gas to form a liquid hydrocarbon, or carbon may be added to hydrocarbon gases and combined with excess hydrogen contained in such gases to form a hydrocarbon liquid. The former case would be de-hydrogenation of hydrocarbon gases and the latter case would be carbonization of hydrocarbon gases.

The apparatus shown will be used to de-hydrogenate gas in the following manner: Hydrocarbon gas in either liquid or gaseous state will be delivered by pump 19 through the pipe 16 and will be heated therein to a temperature preferably between 700 degrees F. and 1000 degrees F. I find that good results may be obtained at 875 degrees F. and that when this temperature is obtained under pressures between 2,000 and 3,000 pounds per square inch, a good conversion from gases to liquids is obtained. After the conversion of part of the gases to liquid has taken place in the pipe 16, cold hydrocarbon liquid will be delivered into said pipe 16 through the pipe 78 by means of the pump 80 in order to cool the mixture of gases and liquid down to such a temperature, say 400 degrees to 600 degrees F., that only gases which are more volatile than gasoline will remain in the vapor or gaseous phase, the cooled converted gases and liquid, together with the hydrocarbon liquid which was extraneously supplied, will then flow into separator 2. Gases and vapors which are more volatile than gasoline will then flow through pipe 28 and condenser 8 into separator 3. The gases and vapors passing through condenser 8 will be cooled and a mixture of liquid and gas will be delivered into separator 3. The material which remains in a gaseous state after passing condenser 8 will be vented from separator 3 and the system through pipe 32 and back pressure valve 33. Some of this gas delivered into separator 3 may be charged to the process through pipe 16 by means of the pipe 50 and the pump 49. Liquid which will collect in separator 3 will be withdrawn therefrom and recirculated through the pipe 16 and thereby through the process by means of pump 46 and pipe 41. Liquid trapped in separator 2 will contain material which is more volatile than gasoline. This liquid will be delivered from separator 2 through pipe 20 into fractionating column 13. The fractionating column 13 will be reboiled by means of circulating liquid through the pipe 62 and through the furnace. Vapors will flow from fractionating column 13 through pipe 29 and be cooled and condensed in condenser 9 and will flow thence into separator 4. Liquid will be refluxed from the bottom of separator 4 by pump 57 through pipe 58 into the top of fractionating column 13 and a temperature at the top of fractionating column 13 will be maintained such that only liquids which are more volatile than gasoline will leave the fractionating column 13 in the vapor phase through the pipe 29. Liquids which collect in separator 4 will be recharged to the apparatus through the pipe 16 by means of the pump 42 and the pipes 43 and 41. Permanent gases which may collect in separator 4 will be vented from the system through pipe 34 and back pressure valve 35. Gases which collect in separator 4 may be recharged to the apparatus through pipe 16 by means of pump 54 and pipes 55 and 50. Liquid which contains gasoline and heavier hydrocarbon material will be discharged from the bottom of fractionating column 13 into the fractionating column 14. The bottom of fractionating column 14 will be reboiled by means of circulating liquid through the pump 63 and the pipe 64, and through the furnace. Vapors will be discharged from the fractionating column 14 through the pipe 30 and will be cooled and condensed by the condenser 10 and will flow in liquid form into the separator 5. Liquid will be refluxed from the separator 5 by the pump 59 through the pipe 60 into the top of fractionating column 14, and the temperature at the top of fractionating column 14 will be so maintained that only gasoline vapor will discharge through the pipe 30. Gasoline will be withdrawn from the system through the pipe 44 and the valve 45. Any gases which may accumulate in separator 5 will be vented therefrom through the pipe 36 and valve 37. Liquids which are heavier than gasoline, that is, fuel oil and gas oil, may be withdrawn from the bottom of fractionating column 14 through the pipe 85, pump 86, valve 93 and pipe 92 to storage, or such liquids may be recirculated through the pipe 16 by means of pumps 86 and 67 and pipe line 85, 81, 65 and 68, or such liquids may be recirculated through pumps 86 and 80 through pipes 85, 81 and 78, or such liquids may be discharged from the bottom of fractionating column 14 into the vacuum distillation unit consisting of separator 7, condenser 11, separator 6, and accessory pumps, pipe lines, and vacuum pump 39. This vacuum distillation unit is conventional and is for the purpose of separating gas oil or lubricating oil from fuel oil. Vapors which will be evolved in separator 7 under the low pressure conditions existing therein will pass therefrom through pipe 31 and will be condensed in condenser 11 and flow into separator 6, while tars which will collect in the bottom of separator 7 will be withdrawn therefrom by pump 26 through pipe line 27. Gas oil which will collect in separator 6 may be recirculated through pipe 16 by way of pipes 88, 81 and 68 or by way of pipes 88, 81, and 78. Through manipulation of valves 18 and 21 and 33, a pressure of between 2,000 pounds to 3,000 pounds per square inch will preferably be maintained in separator 2 and separator 3 and in pipe lines accessory to the separators. By manipulating valves 23 and 35 a pressure preferably from 400 pounds to 700 pounds per square inch, but sufficiently high to condense in condenser 9 all vapors which pass through pipe 29 will be maintained in the fractionating column 13 and the separator 4 and accessory pipe lines. By manipulation of the valve 37 preferably atmospheric pressure will be maintained in the fractionating column 14, separator 5, and connecting pipe lines. By this method of operation, natural gas or constituents of natural gas may be charged to this apparatus through the pipe 16, and this material will be converted into synthetic crude oil and gases. The apparatus is so arranged that after this conversion has taken place the converted material may be separated into the following fractions: Permanent gases which are vented from the system, gases which are more volatile than gasoline and which are recirculated through the process, gasoline which is recovered separately as a product of the process, and hydrocarbon liquids which are heavier than gasoline and which are recirculated through the process. Gas delivered to the apparatus would ordinarily contain certain permanent gases which if not vented from the system would in a short time fill the system up and discontinue the operation of the process, also, hydrogen will be continuously evolved within the system, and if this gas is not vented from the system it will become filled with hydrogen and cease to operate. The material produced within the apparatus which is more volatile than gasoline and which is recycled through the apparatus is maintained under high pressure at all times and preferably in liquid form in order that recirculation may be accomplished economically. When gas only is supplied from an extraneous source to the apparatus, a considerable quantity of hydrogen will necessarily be vented from the system.

Instead of supplying gas only to this process, fuel oil or gas oil may be supplied from an extraneous source to supply carbon with which to combine the excess hydrogen contained in the gas in which case hydrogen will preferably not be vented from the system and only such permanent gases as are inadvertently introduced into the system with the gas and heavy oil will be separated from other material in the system and vented therefrom. Liquids which contain a higher percentage of carbon than is contained in gasoline will be introduced into the system either through pipe 65 or pipe 78. In the event that crude oil should be introduced into this system, it should be introduced through the pipe 78 and gasoline contained in this crude oil would be distilled and separated from the fuel oil and gas oil contained in the crude oil in the fractionating system and the gas oil and fuel oil contained in this crude oil would enter the pipe 16 as a recirculated liquid coming from either fractionating column 14 or separator 6. This is an indirect way of introducing fuel oil or gas oil into the system when crude oil only is available for the purpose.

It will be found desirable in some cases to cool any liquid which is heavier than gasoline and which is introduced into the pipe 16 and to initially use this heavy oil for an absorbent to absorb constituents of natural gas and subsequently introduce the mixture of heavier than gasoline liquids and lighter than gasoline liquids thus produced into the pipe 16. The absorber 15 with interconnecting lines shown may be used for this purpose.

As stated in my original application for Letters Patent covering this gas conversion process, I do not propose to limit the process to natural gas but may use the process to convert other hydrocarbon gases to liquids and it should be understood that the improvements which are divulged and claimed herein may be used in a manner similar to that described to process hydrocarbon gases other than natural gas. I will probably process hydrocarbon gases which are produced by the cracking of heavy oils such as gas oil and fuel oil. In some cases, I will in the manner described herein, add carbon which is contained in heavy oils such as fuel oil or gas oil, to hydrocarbon gases which result from cracking natural gas under comparatively low pressure and at high temperature instead of adding such heavy oils to the virgin natural gas.

The apparatus disclosed herein is claimed in a divisional application, Serial No. 39,839, filed September 9, 1935. Some of the specific features of my process are claimed respectively in a divisional application Serial No. 39,840, filed September 9, 1935, and in a continuation-in-part application Serial No. 51,506, filed November 25, 1935.

What I claim and desire to secure by Letters Patent is:

1. A process of the character described, comprising feeding a stream of normally gaseous hydrocarbon material through a non-catalytic heating zone, heating said material in said zone to a temperature between 750 and 1000° F., while maintaining the same under a pressure between 2000 and 3000 pounds, adding a hydrocarbon liquid heavier than gasoline to said stream after the heating and thereby cooling said stream, separating from the resulting mixture gasoline, permanent gases and hydrocarbon vapors that are lighter than gasoline, discharging the permanent gases and returning said hydrocarbon vapors under super-atmospheric pressure to the inlet of the heating zone and introducing the same into said first mentioned stream.

2. A process of the character described, comprising forcing a normally gaseous hydrocarbon stream through a heating zone under super-atmospheric pressure while heating the stream to the point required to convert some of the normally gaseous material into heavier hydrocarbons, afterwards adding a hydrocarbon liquid heavier than gasoline to the stream, separating from the resulting mixture gasoline and hydrocarbon vapors lighter than gasoline, recycling said vapors under super-atmospheric pressure and introducing the same into said first mentioned stream, and venting permanent gases from the system.

3. A process of the character described, comprising flowing a stream of normally gaseous hydrocarbons through a heating zone, and into a separating chamber, subjecting the stream in said zone to sufficient heat and pressure to convert some of the gaseous hydrocarbons into liquid hydrocarbons, mixing hydrocarbon oil heavier than gasoline with the stream as it flows from the heating zone to the separator, maintaining the separator under super-atmospheric pressure, discharging hydrocarbon material lighter than gasoline from the separator, mixing some of said discharged material with the first mentioned stream and recycling it through the heating step of the process, discharging gasoline and heavier hydrocarbons from the separator, and rectifying said gasoline and heavier hydrocarbons under a pressure lower than that maintained in the separator and thereby separating gasoline from heavier hydrocarbons.

4. A process of the character described, comprising flowing a stream of normally gaseous hydrocarbons through a heating zone and into a separating chamber, subjecting the stream in said zone to sufficient heat and pressure to convert some of the gaseous hydrocarbons into liquid hydrocarbons, mixing hydrocarbon oil heavier than gasoline with the stream as it flows from the heating zone to the separator, maintaining the separator under super-atmospheric pressure, discharging hydrocarbon material lighter than gasoline from the separator, mixing some of said discharged material with the first mentioned stream and recycling it through the heating steps of the process, discharging gasoline and heavier hydrocarbons from the separator, rectifying said gasoline and heavier hydrocarbons under a pressure lower than that maintained in the separator and thereby separating gasoline from heavier hydrocarbons, and feeding some of the last mentioned heavier hydrocarbons into the gaseous stream entering the heating zone.

5. A process of the character described, comprising feeding a stream of normally gaseous hydrocarbons through a heating zone, mixing with the stream a hydrocarbon liquid heavier than gasoline, subjecting the stream in the heating zone to sufficient heat and pressure to convert some of the normally gaseous hydrocarbons into liquid hydrocarbons, feeding the resulting stream into a separating chamber, discharging a liquid portion of the stream from the separating chamber, reducing the pressure on said portion and rectifying the same under reduced pressure and thereby separating hydrocarbons lighter than gasoline from said portion, and feeding some of the last mentioned hydrocarbons under super-atmospheric pressure into the stream entering the heating zone.

6. A process of the character described, comprising feeding a stream of normally gaseous hydrocarbon material through a heating zone and into a separating chamber, adding a hydrocarbon liquid heavier than gasoline to said stream, subjecting the stream in the heating zone to sufficient pressure to convert some of the normally gaseous hydrocarbons into liquid hydrocarbons, maintaining the separating chamber under super-atmospheric pressure, discharging from the separating chamber a hydrocarbon mixture made up of gasoline, material lighter than gasoline, and oil heavier than gasoline, rectifying the last mentioned mixture under a pressure lower than that existing in the separating chamber and thereby separating gas from the mixture, and recycling the last mentioned gas under super-atmospheric pressure from the rectifying step and introducing the same into the gaseous stream entering the heating zone.

7. A process of the character described, consisting in feeding a stream of normally gaseous hydrocarbons through a heating zone and into a separating chamber, adding hydrocarbon liquid heavier than gasoline to said stream, subjecting the stream in said zone to sufficient heat and pressure to convert some of the normally gaseous hydrocarbons into liquid hydrocarbons, maintaining said separating chamber under the same pressure existing in the heating zone, discharging gases from the upper portion of the separator and returning some of the last mentioned gases under substantially the first mentioned pressure to the gaseous stream entering the heating zone, discharging a liquid hydrocarbon mixture from the lower portion of the separator, rectifying the last mentioned mixture under a pressure lower than that existing in the separating chamber, and thereby separating gas from the last mentioned mixture, and compressing the last mentioned gas and feeding the same into the stream entering the heating zone.

8. A process of the character described, comprising continuously feeding a stream of normally gaseous hydrocarbon material through a non-catalytic heating zone and into a separating chamber, adding a hydrocarbon oil heavier than gasoline to the stream after the stream leaves said zone and before the stream enters the separating chamber, heating the stream in said zone to a temperature between 750 and 1000° F., maintaining said zone and the separating chamber under a pressure between 2000 and 3000 pounds, discharging gases from the separating chamber, passing some of the last mentioned gases out of the system and others of the last mentioned gases into the stream entering the heating zone, discharging a liquid mixture from the separator, and rectifying the last mentioned mixture under a pressure less than that existing in the separating chamber.

9. A process for the manufacture of comparatively less volatile hydrocarbons from gaseous hydrocarbon material, which comprises circulating an endless stream of hydrocarbon material which at atmospheric temperature and under atmospheric pressure is gaseous, heating said stream along a part of the line of travel to the temperature of conversion, subsequently cooling said stream along a part of the line of travel, adding comparatively non-volatile hydrocarbon material to said stream at a point along the line of travel subsequent to said heating, and subsequent to said addition of comparatively non-volatile hydrocarbon material to said stream, separating from said stream by rectification and withdrawing from the sphere of the process, hydrocarbon material which is less volatile than said stream of gaseous hydrocarbon material, all of said operations being carried on under pressures between 500 and 3000 pounds per square inch.

10. A process for the manufacture of comparatively less volatile hydrocarbons from gaseous hydrocarbon material, which comprises circulating an endless stream of hydrocarbon material which at atmospheric temperature and under atmospheric pressure is gaseous, heating said stream of gaseous hydrocarbon material along a part of the line of travel of said stream to the temperature of conversion, subsequently cooling said stream along a part of the line of travel, adding comparatively non-volatile hydrocarbon liquid to said stream at a point along the line of travel subsequent to said heating and before it has been cooled, and subsequent to the addition of said comparatively non-volatile hydrocarbon liquid to the stream, separating from the stream by rectification and withdrawing from the sphere of the process a hydrocarbon liquid which is less volatile than said stream of gaseous hydrocarbon material and permanent gas, and continuously discharging permanent gas from the stream subsequent to the heating, all of said operations being carried on under pressures between 500 and 3000 pounds per square inch.

11. The process for converting hydrocarbon gas into comparatively less volatile hydrocarbon liquid, which consists in heating said gas while under super-atmospheric pressure to a temperature between 700 and 1000° F., bringing said heated gas into contact with hydrocarbon liquid which is comparatively less volatile than gasoline, fractionating the resulting mixture into at least three fractions, one of said fractions being at least partially consistent of permanent gas, one of said fractions being at least partially consistent of gasoline, one of said fractions being at least partially consistent of hydrocarbon material, the boiling point of which is intermediate between said permanent gas and gasoline, withdrawing from the sphere of the process said fraction which contains gasoline, venting from the sphere of the process said fraction which contains permanent gas, and recirculating through the process said fraction which contains materials having a boiling point intermediate between said permanent gas and gasoline.

12. The process for converting hydrocarbon gas into comparatively less volatile hydrocarbon liquid, which consists in heating said gas under super-atmospheric pressure to a temperature between 700 and 1000° F., bringing said heated gas into contact with hydrocarbon liquid which is comparatively less volatile than gasoline, fractionating the resulting mixture into at least three fractions, one of said fractions being at least partially consistent of permanent gas, one of said fractions being at least partially consistent of gasoline, one of said fractions being at least partially consistent of hydrocarbon material, the boiling point of which is intermediate between said permanent gas and gasoline, withdrawing from the sphere of the process said fraction which contains gasoline, venting from the sphere of the process said fraction which contains permanent gas and recirculating through the process said fraction which contains materials having a boiling point intermediate between said permanent gas and gasoline, all of said process being carried out under super-atmospheric pressure.

13. A process for the manufacture of comparatively less volatile hydrocarbons from gaseous hydrocarbon material, which comprises circulating an endless stream of hydrocarbon material which at atmospheric temperature and under atmospheric pressure is gaseous, heating said stream along a part of the line of travel to a temperature between 700 and 1000° F. under super-atmospheric pressure, subsequently cooling said stream along a part of the line of travel, adding comparatively non-volatile hydrocarbon material to said stream at a point along the line of travel after it has been heated and before it has been cooled, and subsequent to said addition of comparatively non-volatile hydrocarbon material to said stream, separating from said stream by rectification and withdrawing from the sphere of the process, hydrocarbon material which is less volatile than said stream of gaseous hydrocarbon material, all of said operation being carried on under super-atmospheric pressure.

14. The process for converting hydrocarbon gas into comparatively non-volatile hydrocarbon liquid which comprises compressing such a gas to a high super-atmospheric pressure, continuously feeding said compressed gas through a heating zone maintained at a temperature between 700 and 1000° F., introducing liquid hydrocarbons heavier than gasoline into the compressed gas, maintaining the mixture of gas and liquid hydrocarbons at said pressure and temperature for a time sufficient to convert a portion of the gas into liquid hydrocarbons, fractionating the resulting mixture and thereby separating from the same fixed gas, gasoline and hydrocarbon vapors heavier than said fixed gas and lighter than said gasoline, releasing the fixed gas substantially constantly from the process, withdrawing gasoline from the process and returning the hydrocarbon vapors for reprocessing in the same cycle.

15. The process for converting gas, the hydrogen content of which is greater than the hydrogen content of gasoline, into hydrocarbon liquid, comprising heating said gas under heavy super-atmospheric pressure to a temperature between 700 and 1000° F. and thereby converting a portion of said gas into liquid hydrocarbons, mixing the resulting gaseous mixture while it is in heated condition with a hydrocarbon liquid, the carbon content of which is greater than the carbon content of gasoline, fractionating the last mentioned mixture and thereby separating from the same a gasoline fraction, a permanent gas fraction, and a vapor fraction which is lighter than gasoline and heavier than permanent gases, the hydrogen content of the permanent gas fraction being greater than the hydrogen content of gasoline, withdrawing the gasoline fraction from the sphere of the process, and recirculating through the process some of said vapor fraction.

16. The process for converting gas, the hydrogen content of which is greater than the hydrogen content of gasoline, into hydrocarbon liquid, comprising heating said gas under heavy super-atmospheric pressure to a temperature between 700 and 1000° F. and thereby converting a portion of said gas into liquid hydrocarbons, mixing the resulting gaseous mixture while it is in heated condition with a hydrocarbon liquid, the carbon content of which is greater than the carbon content of gasoline, fractionating the last mentioned mixture and thereby separating from the same a gasoline fraction, a permanent gas fraction, and a vapor fraction which is lighter than gasoline and heavier than permanent gases, the hydrogen content of the permanent gas fraction being greater than the hydrogen content of gasoline, withdrawing the gasoline fraction from the sphere of the process, and recirculating through the process some of said vapor fraction, said fractionation being carried out under super-atmospheric pressure.

17. A process of the character described, comprising feeding a stream of normally gaseous hydrocarbons through a heating zone, mixing with the stream a heavier hydrocarbon liquid, subjecting the stream in the heating zone to sufficient heat and pressure to convert some of the normally gaseous hydrocarbons into liquid hydrocarbons, feeding the resulting stream into a separating chamber, discharging a liquid portion of the stream from the separating chamber, reducing the pressure on said portion and rectifying the same under reduced pressure and thereby separating hydrocarbons lighter than gasoline from said portion, feeding some of the last mentioned hydrocarbons under superatmospheric pressure into the stream entering the heating zone, and separating gasoline from the last mentioned portion under substantially atmospheric pressure.

18. A process of the character described, comprising feeding a stream of normally gaseous hydrocarbons through a heating zone and into a separating chamber, adding a hydrocarbon liquid heavier than gasoline to the stream before it reaches the separating chamber, subjecting the stream in said zone to sufficient heat and super-atmospheric pressure to convert some of the gaseous hydrocarbons into liquid hydrocarbons, maintaining the separating chamber under super-atmospheric pressure, separating in said chamber permanent gases and vapors lighter than gasoline from heavier liquid, discharging said permanent gases and said vapors from the upper portion of the separating chamber and then separating said permanent gases from said vapors, mixing the last mentioned vapors with the first mentioned stream, discharging from the lower portion of the separating chamber material consisting mainly of gasoline and heavier hydrocarbons, rectifying the last mentioned material under a pressure lower than that existing in the separating chamber and thereby separating gasoline from heavier hydrocarbon material, and subjecting some of said last mentioned heavier hydrocarbon material to vacuum distillation.

19. A process for the conversion of normally gaseous hydrocarbons to normally liquid hydrocarbons which comprises flowing a stream of said gaseous hydrocarbons through a tube under high pressure, heating said stream during passage through said tube to a temperature in excess of 750° F. whereby some of said gaseous hydrocarbons will be converted to liquid hydrocarbons, and adding hydrocarbon oil to said stream of gaseous hydrocarbons after said stream has been heated and prior to substantial reduction of said pressure under which said stream is held subsequent to said addition of oil.

20. A process for the conversion of normally gaseous hydrocarbons to normally liquid hydrocarbons which comprises flowing a stream of said gaseous hydrocarbons through a tube under high pressure, heating said stream during passage through said tube to a temperature in excess of 750° F. such that some of said gaseous hydrocarbons will be converted to liquid hydrocarbons, adding hydrocarbon oil to said stream of gaseous hydrocarbons after said stream has been heated and prior to substantial reduction of said pressure under which said stream is held subsequent to said additon of oil, and subjecting a portion of the gaseous material produced by said conversion to like treatment.

21. The process for converting hydrocarbon gas into comparatively non-volatile hydrocarbon liquid, which comprises compressing such a gas to a pressure in excess of 500 pounds per square inch, continuously feeding said compressed gas through a heating zone maintained at a temperature above 750° F., maintaining the gas in said heated and compressed state for a time sufficient to convert a portion of the gas into liquid hydrocarbons, admixing hydrocarbon liquid with the gas which is processed, separating the resulting mixture into fixed gas, gasoline and a hydrocarbon fluid heavier than said fixed gas and lighter than said gasoline, releasing the fixed gas substantially constantly from the process, withdrawing gasoline from the process, and returning the hydrocarbon fluid for reprocessing in the same cycle.

22. The process of converting hydrocarbon materials which are normally gaseous at atmospheric pressure and temperature into normally liquid hydrocarbon materials comprising treating said gaseous materials, while under pressure in excess of 500 pounds per square inch and a temperature in excess of 750° F. and maintaining said material in such heated and compressed state for a time sufficient to convert said gaseous material into a mixture of liquid, fixed gas and a material intermediate of liquid and fixed gas, commingling a hydrocarbon liquid which is rich in carbon with said first-mentioned gaseous materials while said gaseous materials are subjected to said pressure and temperature conditions and before conversion is completed and thereby cracking said hydrocarbon liquid which is rich in carbon, in the presence of the gaseous materials, and after said commingling, withdrawing liquid, removing fixed gas and further processing the intermediate material in a similar treatment.

MALCOLM P. YOUKER.